Patented July 28, 1925.

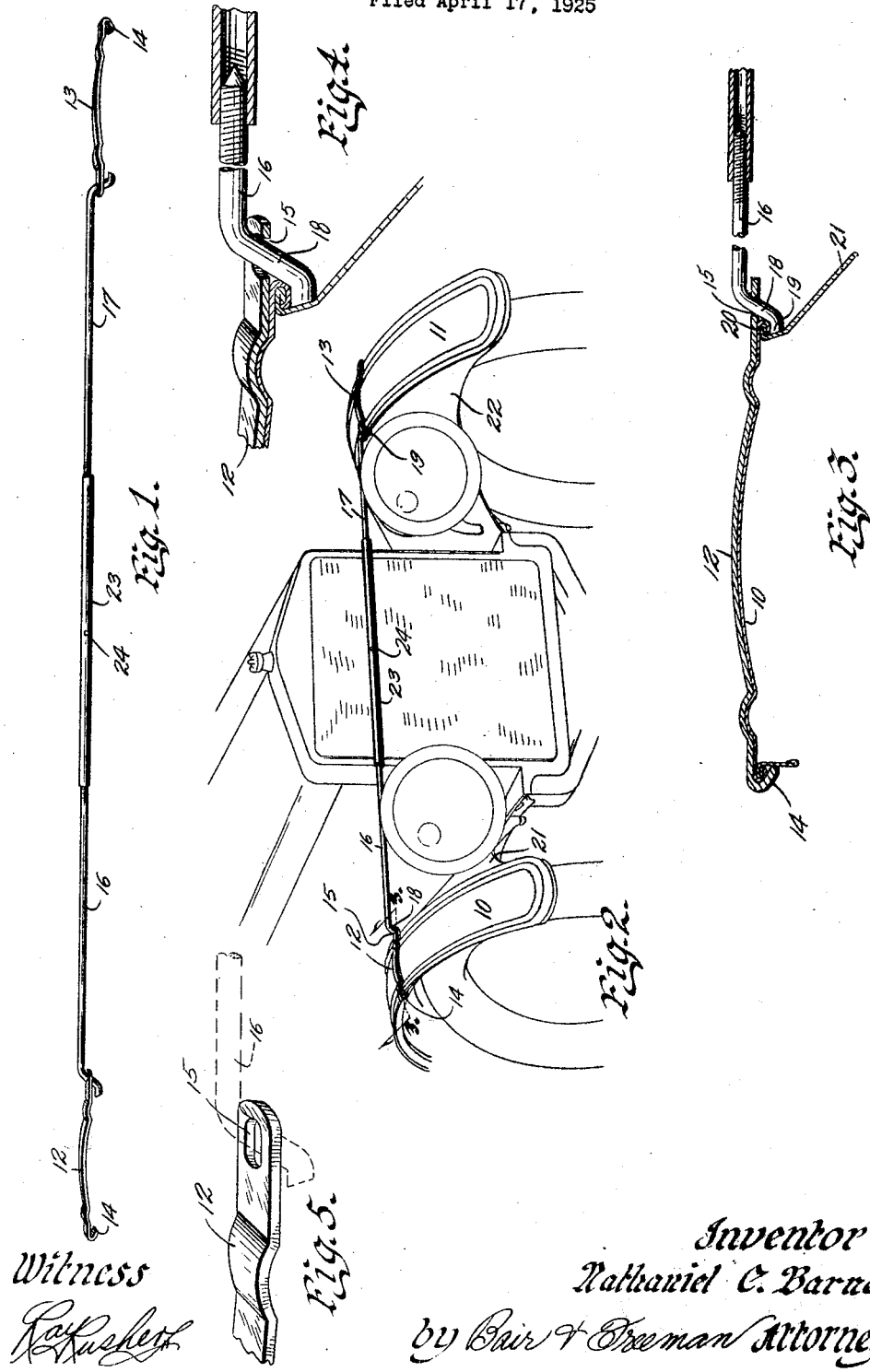

1,547,551

UNITED STATES PATENT OFFICE.

NATHANIEL C. BARNES, OF DES MOINES, IOWA.

FENDER BRACE.

Application filed April 17, 1925. Serial No. 23,846.

*To all whom it may concern:*

Be it known that I, NATHANIEL C. BARNES, a citizen of the United States, residing in Des Moines, in the county of Polk and State of Iowa, have invented a certain new and useful Fender Brace, of which the following is a specification.

This invention relates to bracing means for automobile fenders to hold the fenders rigidly in place and prevent vibration, rattling and breakage.

A particular object of the present invention is to provide an improved fender brace so designed and constructed as to eliminate vibration of the parts of the brace itself between the members designed to be braced.

A further object of this invention is to provide an improved fender brace so designed as to facilitate packing and to permit the disassembled parts to be disposed in a package of minimum length.

A further object of this invention is to provide an improved fender brace in which the several members employed for connecting the two fender form members are as near as possible of uniform weight per lineal inch throughout their lengths.

Still a further object is to provide a pair of fender form connecting rods having parts at one end adapted to coact with the fender forms and having their free ends oppositely threaded for receiving a tubular member having interiorly arranged screw threads for connection with the ends of said connecting rods, whereby the fenders may be drawn towards each other, the rods and tubular member being substantially the same length from end to end and substantially the same weight per lineal inch of their length.

Still a further object is to provide a fender brace structure composed of a minimum number of parts and adapted to be secured to the fenders of an automobile of the Ford type, wherein the fenders may be braced against movement toward or from each other by means of a pair of fender forms adapted to rest upon the fenders themselves and coact with the outer marginal bead thereof and to connect the two fender forms together by a pair of rods and a tubular member.

Still a further object is to employ two rods and a tubular member adjustably connected together for varying the distance between the two fender forms, the ends of the rods adjacent the fender forms being beveled and adapted to abut against the apron of the fenders themselves, when the two fender forms together with the fenders are drawn toward each other by movement of the tubular member relative to the two rods to which it is connected, thus bracing the fenders against undue movement towards each other and yet retaining them by means of the outer marginal beads engaging with the fender forms against undue outward movement.

Still a further object is to provide a fender brace structure adapted to maintain the inner and outer marginal edges of the fenders in substantial horizonal alinement, even when tension is applied to the fenders by means of the fender brace structure.

It may be here mentioned that in a fender brace structure embodying a connection between two spaced fenders, it is desirable to provide an adjustable connecting means of substantially equal weight per lineal inch from one fender to the other fender, so as to prevent undue upward and downward vibration when the automobile is traveling over rough roads, and it is my object to provide connecting rods and a tubular member all of substantially the same length from end to end and having substantially the same weight of material per lineal inch so as to avoid any undue vibration that might be caused by parts of unequal weight.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view showing my improved fender brace in assembled relation but detached from a vehicle.

Figure 2 is a perspective view showing one of the braces arranged in position for use on the forward end of an automobile.

Figure 3 is a longitudinal, sectional view of a portion of the device, on an enlarged scale substantially on the line 3—3 of Figure 2.

Figure 4 is a perspective, sectional view, showing the connection between the fender form and the connecting rod; and Figure 5 is a detail, perspective view of the inner end portion of one of the fender clamps.

The numerals 10 and 11 designate opposed fenders of an automobile and 12 and 13 are fender clamps or forms adapted to be disposed transversely of said fenders.

The fender clamps or forms 12 and 13 are formed of metal straps and preferably are shaped to conform substantially to the contour of the upper surface of the fenders, and said clamps are alike in construction but are oppositely arranged. Each fender clamp 12 and 13 is formed at its outer end with a hook 14 adapted to engage the outer edge or bead of the fender on which it is mounted.

The inner ends of the clamps 12 and 13 are substantially straight and in a horizontal plane, and extend inward beyond the inner marginal edge of the fenders upon which they rest.

A slot 15 as shown in Figure 5 is formed in the portion extending beyond the inner edge of the fender.

Coacting tie rods 16 and 17 are provided, which are also alike in construction but oppositely arranged, and each is threaded at its inner end. At their outer ends the tie rods are formed with offset shanks 18 extending outwardly and downwardly in inclined positions and terminating in short jaws 19 substantially parallel with the bodies of the rods and preferably beveled at their ends on angles opposite to the inclination of the offset shanks.

The offset shanks 18 of the tie rods 16 and 17 are adapted to be placed respectively through the slots 15 of the projecting inner ends of the fender clamps 12 and 13 with the beveled jaws engaging in the angle between the inner marginal bead 20 of a fender 10 or 11, and the apron 21 or 22, which extends downwardly and inwardly toward the body of the automobile.

Pressure is applied manually to cause the tie rods to assume a horizontal position and said tie rods, acting as levers with their inclined shanks 18 extending through the slotted holes 15 of the fender clamps as fulcrums, cause the jaws 19 to forcibly engage the inner marginal beads 20 of the fenders as clearly shown in Figure 4 of the drawings. This action causes the fender clamps 12 and 13 to be pressed tightly against the tops of the fenders and to exert an upward and inward pull on the outer portions of said fenders through the hooks 14.

The threaded inner ends of the tie rods 16 and 17 are adjustably connected by means of a tubular member 23 which is oppositely threaded interiorly at its ends, and said connecting member is threaded upon said tie rods to the extent necessary to place the fenders under the desired tension to prevent vibration and sagging in use.

The inner ends of the rods 16 and 17 are tapered for permitting easy insertion and threading of the rods into the tubular member 23.

The tubular connecting member 23 may be formed with a transverse hole 24 to receive a nail or other suitable tool for convenience in rotating it.

The two tie rods 16 and 17 and the connecting member 23 are of substantially uniform length, each occupying practically one-third of the distance between the two fenders and fender clamps.

The tubular member itself is of uniform weight throughout its length and substantially the same weight per lineal inch as the rods 16 and 17. I have found that this arrangement tends to prevent or minimize the amount of vibration of the brace structure itself when the automobile is in motion as there is no disproportionate amount of weight at any point in the connecting means and particularly near the center where the vibration would naturally be greatest.

The uniform length of the rods and connecting member also makes for convenience in packing the disassembled parts of the device for shipping, and makes it possible to use a package of minimum length and not much greater than the length of any one of these parts.

The connecting parts between the two fenders being all of substantially the same length and weight makes for appearance and at the same time gives the rigidity and stability necessary in a fender brace structure.

This application is a continuation in part of my application filed August 18, 1924, Serial No. 732,613.

Some changes may be made in the construction and arrangement of the various parts of my invention, without departing from the real spirit and purpose of my invention, and it is my intention to cover by my claims, any modified forms of structure or use of mechanical equivalents, which may be reasonably included within their scope.

I claim as my invention:

1. A fender brace for automobiles, comprising a pair of hooked clamp members adapted to engage the outer marginal edges of the fenders and overlying the inner marginal edges of the fenders, a connecting member between the clamp members comprising three cylindrical rods of substantially uniform length adapting them for convenient packing and shipping, the two end rods telescoping into and tightly fitting the ends of the middle rod whereby the rod when in use will be larger at its center section to prevent bending, the free ends of said two outer rods adapted to engage said clamp members, and thereby affording a rigid substantially inflexible connection between the fenders.

2. A fender brace for automobiles, comprising a pair of clamp members having hooks adapted to engage the outer marginal edges of the fenders and overlying the inner marginal edges of the fenders, a connecting member between the clamp members comprising three cylindrical rods of substantially uniform length adjustably connected by right and left-hand screw threads, the intermediate rod being of tubular form throughout its length and internally screw threaded at its ends for telescopically receiving the screw threaded ends of the outer rods of said connecting member for preventing bending of the connecting member between its ends, the free ends of the outer rods adapted to engage said clamp members, and said clamp members may be tightened upon the fenders or released, thereby affording a rigid substantially inflexible and adjustable connection between the fenders.

Des Moines, Iowa, April 2, 1925.

NATHANIEL C. BARNES.